E. H. ROLLINSON.
WIRELESS BATTERY HOLDER.
APPLICATION FILED MAY 29, 1917.
1,258,814.
Patented Mar. 12, 1918.
2 SHEETS—SHEET 1.
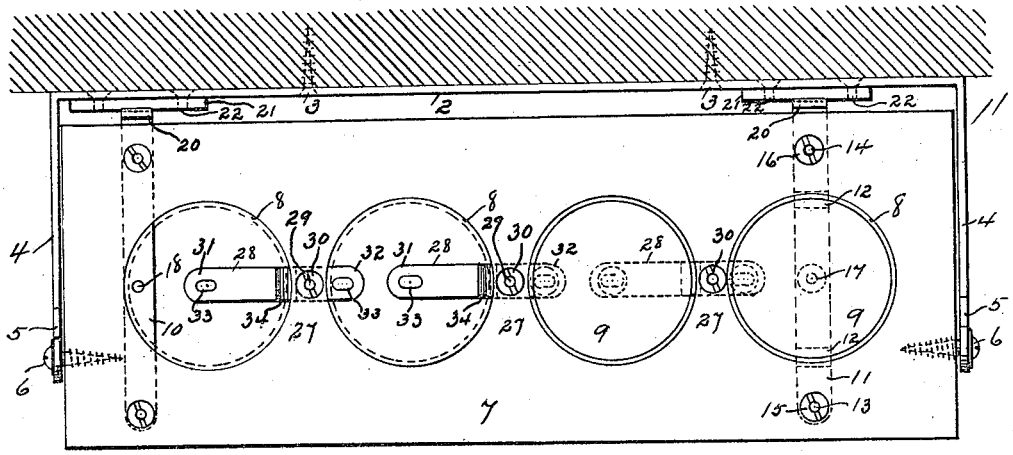
Fig. 1
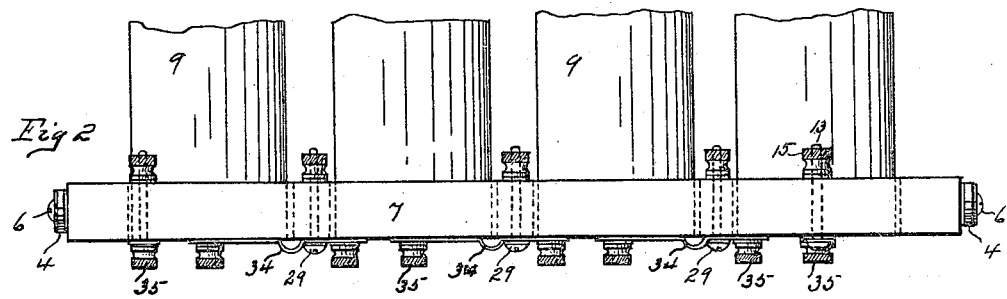
Fig. 2
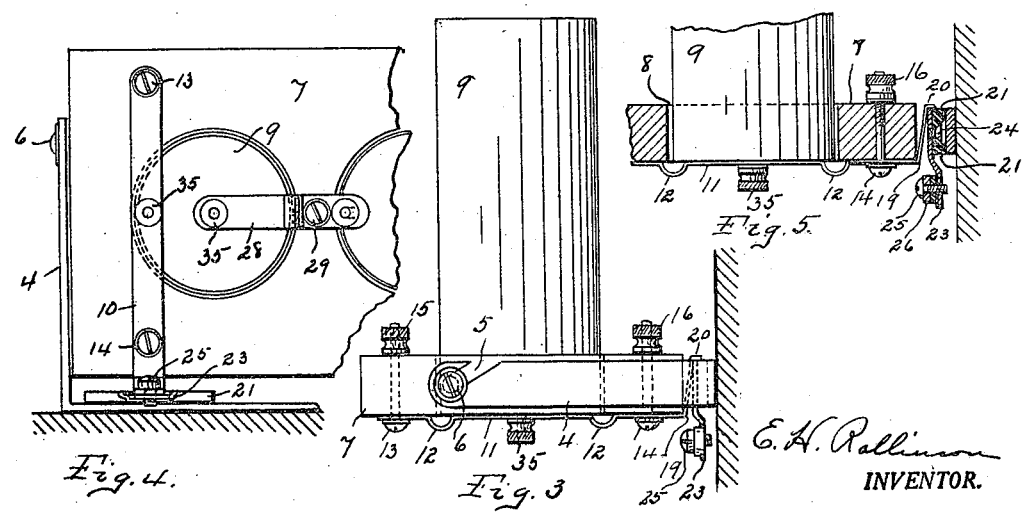
Fig. 4.
Fig. 3.
E. H. Rollinson
INVENTOR.
BY
Louis M. Sanders ATTORNEYS.

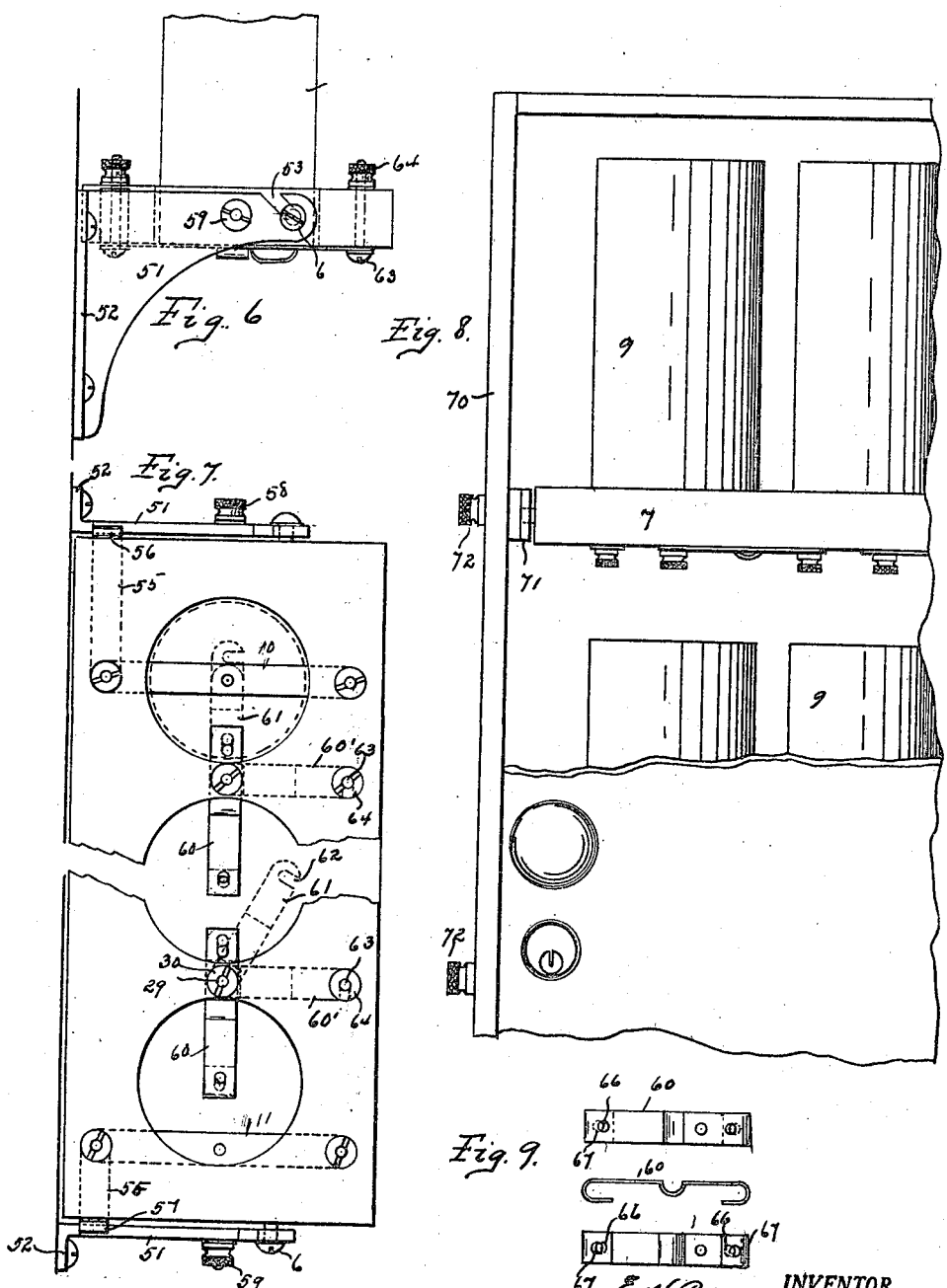

UNITED STATES PATENT OFFICE.

EARL HOYT ROLLINSON, OF LYONS FARMS, NEW JERSEY.

WIRELESS-BATTERY HOLDER.

1,258,814.

Specification of Letters Patent.   Patented Mar. 12, 1918.

Application filed May 29, 1917. Serial No. 171,802.

*To all whom it may concern:*

Be it known that I, EARL H. ROLLINSON, a citizen of the United States, residing at Lyons Farms, county of Union, State of New Jersey, have invented certain new and useful Improvements in Wireless - Battery Holders, of which the following is the specification.

In the many uses to which the modern dry cell battery is put, it becomes quite an essential to economy that these cells be arranged in sets and located in some fixed position where it is not necessary to disturb them for any purpose except the necessary renewal of exhausted cells and the connecting up of the battery set in the circuit where the current is to be utilized. Battery sets or holders of this character have been on the market for a considerable time but so far as I am aware they all provide for the support of the individual cells forming the battery, by means of some sort of suspension, so that the individual cells themselves are supported from the leading out connections. This I have found to be objectionable for the reason that it frequently happens that such battery sets are located in positions which are subject to constant vibration with the result that the suspension connection will gradually work loose and in some cases the cell itself will drop completely away from the holder thereby breaking the circuit, and in certain cases, as for example, where such battery sets are utilized in fire alarm systems, enormous losses might result.

It is the object of my invention to provide such a battery holder wherein it is impossible under ordinary circumstances, for the cell connections to become disarranged, where the cells themselves, instead of being suspended from the leading out connections, are supported directly upon such connections and even if the binding nuts should jar loose and drop off, under the constant vibration to which some battery sets are subjected, there would be no danger of the breaking of the battery circuit.

The invention also contemplates the construction of a battery holder of such a character that the battery set may be connected up as a unit and supported in a wall bracket, forming a part of the holder, and at the same time be readily detached from such bracket. Provision is also made whereby, whenever a cell is removed from any part of the set, the circuit may be closed across what would otherwise be a break in the circuit. Provision is also made for making connections whereby the current from a single cell or from any number of cells in the set may be utilized without the necessity of disarranging the cells after they have once been fixed in the holder.

In carrying out my invention I make use of the structures described in the following specifications and illustrated in the accompanying drawings, wherein—

Figure 1, is a plan view of my improved wireless battery holder.

Fig. 2, is a front elevation of the same.

Fig. 3, is an end elevation of the same.

Fig. 4, is a fractional bottom plan view of the left-hand end of the holder as shown in Fig. 1.

Fig. 5, is a sectional view of line 5—5 of Fig. 1.

Fig. 6, is an end view of the slight modification of the supporting means for the board.

Fig. 7, is a plan view of the same.

Fig. 8, is a front elevation of a battery cabinet supplied with my improved battery holder.

Fig. 9, illustrates top plan, side elevation and bottom plan of a slight modification of the connector strip.

The same reference numerals refer to like parts throughout the specification and drawings.

My invention consists primarily in the following instrumentalities. The flat U-shaped bracket 1, is provided with the elongated member 2, which is utilized for securing it against any desired support, as for instance, a wall, post or partition by means of the screws 3. The arms 4, project at right angles from the extremities of the member 2, and are provided at their outer extremities with the diagonal slots 5, which receive the trunnions 6, of the supporting board 7. From a reference to Figs. 1, 3, and 4, it will be noted that these trunnions are located in the ends of the board 7, at points considerably in advance of the center line thereof. The board 7, is provided with a series of apertures 8 extending completely through the board and of a diameter sufficient to conveniently receive the dry cells 9. Extending across the two outside apertures 8, are the two strip connectors 10 and 11, respectively. These strip connectors are substantially alike in every respect with the single exception that the strip 11, is provided with two arc-shaped bends 12, located immediately beneath the wall of the corresponding aperture 8. This strip connector 11, is also located so as to span immediately across the center of the aperture 8, and is held in place by means of the screws 13, and 14, which extend through the strip 11, and through the board 7, and are provided with the binding nuts 15, and 16, upon the upper ends thereof. The connector strip 11, is also provided with a central aperture 17, which, when said strip is in position is located exactly in the center of the aperture 8. The connecting strip 10, is exactly the same in all respects as the connecting strip 11, with the exception of the bends 12, which in this case are unnecessary. It is also located as shown in Fig. 1, so as to span the edge of the corresponding aperture 8, and is provided with a central aperture 18. Both of the strips 10, and 11, extend to the inner edge of the board 7, as shown in Figs. 4, and 5, where they are given an upward bend as at 19, with the upper free-end of the strip terminating in a substantially rectangular hook 20.

Secured to the member 2, of the bracket 1, at points adjacent to the hooks 20, are the insulating strips 21, respectively. These strips may be secured in any convenient way as for example by means of the screws 22. Upon the face of each one of the insulating strips 21, is located the contact strip 23, the same being secured to the insulating strip 21, by means of the screw 24. The lower end of this contact strip 23, may be provided with the binding screw 25, and the washer 26, for the purpose of connecting in the leading out wires. From the description as thus far given, it will be noted that the member 7, has four points of support, namely: the two trunnions 6, and the two hooks 20, bearing upon the upper extremities of the two contact strips 23; and inasmuch as the trunnions are located at the forward side of the center of gravity of said board, it will be in stable equilibrium when in the position indicated in Figs. 1, to 5. But whenever desired the member 7, may be rotated upon the two trunnions by lifting the rear portion thereof away from the contact strips 23, and tilting said board forward.

The apertures 8, are separated by the bridges 27, to which are secured the intermediate connecting strips 28. These strips are held in position by means of the screws 29, which pass through said strips and through the board 7, and are each supplied at their upper extremtities with the binding nuts 30. The ends of the strips 28, project respectively across the apertures 8, as shown, one end extending a slight distance beyond the center of the aperture as shown at 31, and the other extremity extending only a short distance from the edge of the adjacent apertures at 32. Each extremity is provided with a somewhat elongated slot 33, as shown. At the junction of the strips 28, with the wall of the aperture 8, each of the strips 28, is arched downwardly as at 34.

The dry cells with which the battery holder is supplied are inserted into the apertures 8, with their connecting screws respectively inserted into the adjacent slots 33, of the corresponding connector strips 28, with the exception that the two outer cells 9, are connected into the apertures 17, and 18, respectively. After the binding screws of the various cells have been inserted into the apertures 17, 18, and 33, the binding nuts 35, are screwed up and then all of the cells will be firmly secured in place with the proper battery poles located in the right direction to connect up the cells in series. Leading out connections may now be made either beneath the binding nuts 15, and 16, at the extreme outer edge of the board 7, or if desired such connections may be made at the binding screws 25, upon the connecting strips 23, at the rear of the holder. In this manner, the entire set of cells will be connected in series and the entire voltage of the battery may be utilized. If, however, it is desired to use a smaller voltage and consequently utilize a smaller number of the cells, the connections may be correspondingly made with the intermediate binding screws and nuts 29, and 30, as desired. Thus only one, two or more of the cells may be connected to the outside circuit. In connecting up the batteries into place it is desirable always to swing the board 7, on its trunnions to tip the same bottom-side-up, when, of course, the cells can be inserted into place from the then underside of the board; and when all of the batteries are secured in place by the screwing up of the several binding nuts 35, the board may then be tilted back into place when, of course, the hooks 20, of the strips 10, and 11, will engage the upper extremities of the contact strips 23, and thus hold the parts in position.

In Figs. 6, and 7, I have shown a slight modification of the supports for the battery board 7. In this case the U-shaped bracket 1, is replaced by a pair of brackets 51, each provided with the fastening flange 52, by which they may be readily secured to a wall or partition or any convenient supporting means. The outer free end of the bracket is provided with the diagonal slot 53, to receive the trunnions 6. The wiring connections are exactly the same as those described in connection with Figs. 1, to 5, inclusive as far as they are connected with the board 7. However inasmuch as the two brackets 51, are separated from each other and connected only by means of insulating material, in this case, by the wall, or partition, the insulating strips 21, and contact strips 23, may be omitted and supplemental connection strips 54, 55, may be provided at right angles to the direction of the strips 10, and 11, with their ends terminating in the hooks 56, 57, which rest upon the upper edges of the brackets 51, and in metallic contact therewith. In order to take the current from the battery when mounted in the holder it is only necessary to utilize the two end binding nuts 58, and 59, for the leading out wires. The usual connecting strips 60, are provided for connecting up the several cells in series as hitherto described. I have shown in Fig. 7, an additional set of connectors 61, the purpose of which is to bridge across from one connector 60, to its adjacent connector 60, in case a cell should be removed from the set. These connectors 61, are connected to the binding screw 29, and are of sufficient length to span the gap between the adjacent ends of the connector strips 60. When not in use for bridging this gap, these connectors may be swung around into the position shown at 60' with their laterally slotted ends 62, taking under the heads of the binding screws 63, so that when the binding nuts 64, are screwed up the strips 6, are firmly held in place. This also serves as an additional means for connecting leading out wires so that one, two, or more of the cells in the set may be cut out and instead of the binding nuts 58, 59, being used the binding nuts 64, may be used, the purpose being to make it possible to connect up batteries in any desired manner and yet have the battery connections always accessible.

In Fig. 8, I have shown a fractional part of a battery cabinet 70, in which the supporting parts 71, are secured to the sides of the cabinet so as to support the board 7, and its battery cells 9. The leading out section may be secured in metallic contact with the parts 71, by way of the binding nuts 72. The structure of the board 7, and its connections are identically the same as described in connection with the board illustrated in Fig. 1, and needs no further description.

The connector strips 60, illustrated in place in Fig. 7, are shown in detail in Fig. 9. Each connector consists of the strip having its ends bent around and provided with the perforations 66, 67, which are slightly offset as shown in the top and bottom views of the same so that when the binding screw of the battery is inserted into the aperture 66, it cannot pass through the aperture 67, until such bent portion is pressed forward so that the two apertures 66, and 67, will register. When this is done and the binding screw inserted through both of said apertures the bent portion may be released and the elasticity of the metal will cause the strip to bind firmly upon the binding screw without the necessity of using the binding nuts as heretofore described. This causes a firm and effective metallic contact between the binding screws and the strips 60.

One of the important features of my invention resides in the provision of means for supporting the battery cells 9, in inverted position, not only for the purpose of preventing the binding connections from jarring loose and separating, but also in order that I may take advantage of the peculiar properties of the materials of which the cells are constructed in order to prolong their life. Such cells are usually made of a zinc cup containing some active chemical in moistened or pasty form as an electrolyte, with a carbon prism embedded therein and held in place by some binding cement which is melted and poured over the surface of the electrolyte. The moisture in the electrolyte will slowly gravitate to the lowest point, and gradually dissipate even when the cell is not in active use. When in use up to exhaustion it will be found that the zinc cup is eaten through and efflorescent crystals have formed upon its external surface beginning at a point somewhat below the top and extending for some distance below its middle. The zinc is really the fuel of the battery, and in order that it may be utilized to its capacity the fuel should be completely consumed. This cannot be done when the active surface of the electrolyte falls below the break or eaten out part of the zinc cup. If the cell is moistened by immersion in water the active surface of the electrolyte is raised up to good sound metal in the cup and the cell will again give off current, but only so long as the moisture level of the electrolyte reaches good sound metal in the cup. When the leading out connection is made with the bottom of the cup, then the entire efficiency of the zinc may be utilized. Or if, as in the use of my improved battery holder the cells are inverted, then the recession of the moisture level in the cell will not affect the aggregate output of current, for such recession will not be accompanied by a break in the cup at a point which would also break the circuit. The leading out connections, being at the bottom of the now inverted cell, are always in position to carry current so long as there is zinc left to be acted upon by the moisture laden electrolyte.

I claim:

1. In a battery holder, the combination of an apertured board, a pair of connector strips secured to the under face of said board and extending partly across the aperture therein, and battery cell inverted and set in said aperture with its poles in metallic contact with said connector strips respectively.

2. In a battery holder, the combination of a board having an aperture therethrough, a pair of metallic connector strips secured to the under face of said board and extending partly across said aperture, with an inverted battery cell set into said aperture and supported by said strips, and means for connecting said strips respectively to the poles of said cell.

3. In a battery holder, the combination of a board having a plurality of apertures therethrough, a connector strip secured to the surface of said board and extending from a point adjacent to the side of one of said apertures to a point beyond the middle of the adjacent aperture, inverted battery cells set in said apertures with their poles connected respectively to the corresponding ends of said strips.

4. In a battery holder, the combination of an oblong board having a plurality of apertures therein, means for supporting an inverted battery cell in each of said apertures, said means connecting said cells in series, and means for normally supporting said board with said cells in their inverted positions.

5. In a battery holder, the combination of an oblong board having a plurality of apertures therein, means for supporting a normally inverted battery cell in each of said apertures and for connecting the same in series, and a bracket support upon which said board is pivotally and detachably mounted, for normally supporting said cells in inverted position.

6. In a battery holder, the combination of an oblong board, having a plurality of apertures therein, means for supporting an inverted battery cell in each of said apertures and for connecting said cells in series, means for normally supporting said cells in their inverted positions, and means for supporting said board in inverted position with said cells in their upright positions for replacement.

7. In a battery holder, the combination of an oblong board, having a plurality of apertures therein, means for supporting a normally inverted battery cell in each of said apertures and for connecting said cells in series, a bracket support upon which said board is pivotally and detachably mounted, electrical contacts upon said board and upon said bracket support for connecting said cells in an external circuit.

8. In a battery holder, the combination of a board, having an aperture therethrough, a pair of metallic connector strips secured to the under face of said board and extending partly across said aperture, an inverted battery cell set into said aperture and supported by said strips, means for connecting said strips respectively to the poles of said cell, a bracket support, for said board, contact strips upon said board for engagement with said bracket support and leading out connections from said bracket support for connecting said cell into an external circuit.

9. In a battery holder, the combination of a board, having a plurality of apertures therethrough, connector strips secured to the under surface of said board and extending from points adjacent to the side of each of said apertures to points beyond the middle of the adjacent apertures, inverted battery cells set into said apertures, with their poles connected respectively to the corresponding ends of said connector strips, a bracket support upon which said board is pivotally mounted, contact connections between the ends of said connector strips and said bracket support, with leading out connections whereby, said cells may be connected in series with an external circuit.

10. In a battery holder, the combination of an oblong board, having a plurality of cell connecting strips secured thereto, means for connecting a plurality of cells to said strips, a pivotal support for said board at the ends thereof for normally supporting said cells in inverted position, and for permitting said board to be tilted to bring said cells into upright position for replacement.

11. In a battery holder, the combination of an oblong board, having a plurality of cell connecting strips secured thereto, means for normally supporting said board with said cells in inverted position, said means consisting of horizontally extending bracket supports, with pivotal connections between said bracket supports and the respective ends of said board, and connecting contact stops upon said board and upon said bracket supports for connecting said cells in series with an external circuit.

EARL HOYT ROLLINSON.

Copies of this patent may be obtained for five cents each, by addressing the "Commissioner of Patents, Washington, D. C."